(12) United States Patent
Miny (10) Patent No.: US 11,725,665 B2
(45) Date of Patent: Aug. 15, 2023

(54) COMPRESSOR ROTOR HAVING SEAL ELEMENTS

(71) Applicant: Siemens Energy Global GmbH & Co. KG, Munich (DE)

(72) Inventor: Kevin Miny, Essen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/998,501

(22) PCT Filed: Jul. 8, 2020

(86) PCT No.: PCT/EP2020/069294
§ 371 (c)(1),
(2) Date: Nov. 11, 2022

(87) PCT Pub. No.: WO2022/008049
PCT Pub. Date: Jan. 13, 2022

(65) Prior Publication Data
US 2023/0133059 A1    May 4, 2023

(51) Int. Cl.
*F04D 17/12* (2006.01)
*F04D 29/054* (2006.01)
(Continued)

(52) U.S. Cl.
CPC .......... *F04D 17/122* (2013.01); *F01D 5/022* (2013.01); *F01D 5/066* (2013.01); *F01D 11/005* (2013.01);
(Continued)

(58) Field of Classification Search
CPC .......... F01D 5/043; F01D 5/045; F01D 5/048; F01D 5/066; F01D 11/005; F04D 29/054;
(Continued)

(56) References Cited

U.S. PATENT DOCUMENTS 2,356,605 A * 8/1944 Meininghaus ............ F01D 5/06
                                                           416/193 A
4,247,256 A * 1/1981 Maghon .................. F01D 5/066
                                                           416/198 A
(Continued)

FOREIGN PATENT DOCUMENTS

DE    102015212502 A1    1/2017
EP         3470625 A1    4/2019
(Continued)

OTHER PUBLICATIONS

International Search Report and Written Opinion of the International Searching Authority dated Mar. 9, 2021 corresponding to PCT Application No. PCT/EP2020/069294 filed Jul. 8, 2020.

*Primary Examiner* — Brian P Wolcott
(74) *Attorney, Agent, or Firm* — Enrique J. Mora (57) ABSTRACT

A compressor rotor for turbomachinery, such as a compressor, is provided. Disclosed embodiments can benefit from seal elements that may be arranged to inhibit passage onto respective hirth couplings of process fluid being processed by the compressor. A seal element may be affixed to adjacent rotor components (e.g., adjacent impeller bodies) by way of a slip or interference fit connection to one of the adjacent components and may be affixed to the other adjacent rotor component by way of a elastically flexible frustoconical inner surface of the seal element that permits the seal element to be placed in a spring-loaded condition, which generates a biasing force to circumferentially clamp onto a frustoconical outer surface of the other adjacent rotor component. This arrangement is conducive to user-friendly assembly/disassembly of the seal elements with respect to the adjacent rotor components.

18 Claims, 5 Drawing Sheets

(51) Int. Cl.
  *F04D 29/08* (2006.01)
  *F01D 11/00* (2006.01)
  *F01D 5/02* (2006.01)
  *F01D 5/06* (2006.01)
  *F04D 29/28* (2006.01)

(52) U.S. Cl.
  CPC ......... *F04D 29/054* (2013.01); *F04D 29/083* (2013.01); *F04D 29/286* (2013.01)

(58) Field of Classification Search
  CPC .. F04D 29/083; F04D 29/286; F05D 2240/55; F16J 15/062; F16D 3/84–848
  See application file for complete search history.

(56) References Cited

U.S. PATENT DOCUMENTS

| | | | | |
|---|---|---|---|---|
| 5,628,621 | A * | 5/1997 | Toborg | F01D 5/066 416/198 A |
| 6,406,263 | B1 * | 6/2002 | Meacham | F01D 5/284 416/198 A |
| 8,967,960 | B2 * | 3/2015 | Guenard | F04D 17/122 415/198.1 |
| 9,714,580 | B2 * | 7/2017 | Slavens | F16J 15/062 |
| 9,863,426 | B2 * | 1/2018 | Mönk et al. | F04D 17/12 |
| 10,316,665 | B2 * | 6/2019 | Virkler | F01D 5/02 |
| 10,364,820 | B1 | 7/2019 | Oda et al. | |
| 10,822,979 | B2 * | 11/2020 | Partyka | F01D 11/003 |
| 11,280,207 | B2 * | 3/2022 | Shemyatovskiy | F01D 5/02 |
| 2011/0052371 | A1 | 3/2011 | Aschenbruck et al. | |
| 2015/0316064 | A1 | 11/2015 | Kosamana et al. | |
| 2016/0319820 | A1 | 11/2016 | Venkatachalam et al. | |
| 2018/0291758 | A1 | 10/2018 | Seo | |

FOREIGN PATENT DOCUMENTS

| | | |
|---|---|---|
| JP | 2006138255 A | 6/2006 |
| JP | 2011511900 A | 4/2011 |
| JP | 2016500420 A | 1/2016 |
| JP | 2016540927 A | 12/2016 |
| JP | 2018178993 A | 11/2018 |
| WO | 2015091436 A1 | 6/2015 |
| WO | 2019207761 A1 | 10/2019 |

* cited by examiner

COMPRESSOR ROTOR HAVING SEAL ELEMENTS

BACKGROUND

Disclosed embodiments relate generally to the field of turbomachinery, and, more particularly, to a rotor structure for a turbomachine, such as a compressor.

Turbomachinery is used extensively in the oil and gas industry, such as for performing compression of a process fluid, conversion of thermal energy into mechanical energy, fluid liquefaction, etc. One example of such turbomachinery is a compressor, such as a centrifugal compressor.

BRIEF DESCRIPTION OF THE DRAWINGS

FIG. 2 illustrates the disclosed seal element when in the pre-assembly position.

FIG. 5 illustrates the disclosed seal element when in the pre-assembly position.

DETAILED DESCRIPTION

As would be appreciated by those skilled in the art, turbomachinery, such as centrifugal compressors, may involve rotors of tie bolt construction (also referred to in the art as thru bolt or tie rod construction), where the tie bolt supports a plurality of impeller bodies and where adjacent impeller bodies may be interconnected to one another by way of elastically averaged coupling techniques, such as involving hirth couplings or curvic couplings. These coupling types use different forms of face gear teeth (straight and curved, respectively) to form a robust coupling between two components.

These couplings and associated structures may be subject to greatly varying forces (e.g., centrifugal forces), such as from an initial rotor speed of zero revolutions per minute (RPM) to a maximum rotor speed, (e.g., as may involve tens of thousands of RPM). Additionally, these couplings and associated structures may be exposed to contaminants and/or byproducts that may be present in process fluids processed by the compressor. If so exposed, such couplings and associated structures could be potentially affected in ways that could impact their long-term durability. By way of example, a combination of carbon dioxide (CO2), liquid water and high-pressure levels can lead to the formation of carbonic acid (H2CO3), which is a chemical compound that can corrode, rust or pit certain steel components. Physical debris may also be present in the process fluids that if allowed to reach the hirth couplings and associated structures could potentially affect their functionality and durability.

In view of the foregoing considerations, the present inventor has recognized that attaining consistent high performance and long-term durability in a centrifugal compressor, for example, may involve in disclosed embodiments appropriately covering respective hirth couplings with appropriate sealing structures to inhibit passage onto the respective hirth coupling of process fluid being processed by the compressor, and thus ameliorating the issues discussed above.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

Figure 1:
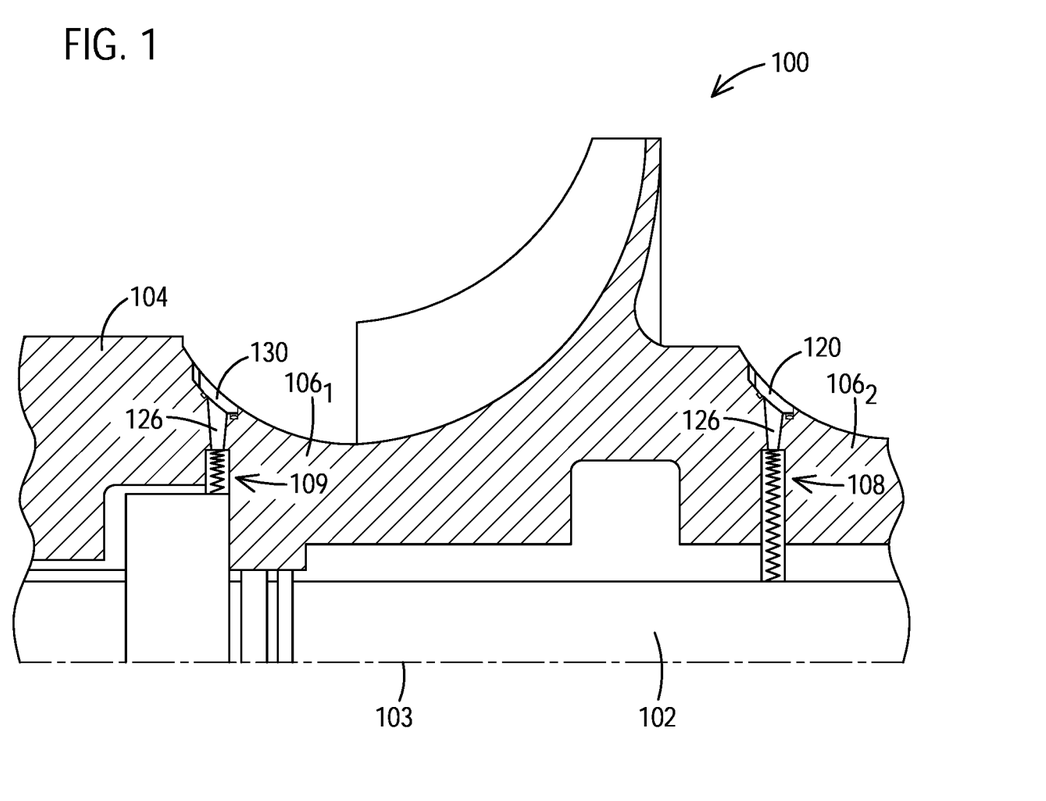
FIG. 1 illustrates a fragmentary cross-sectional view of one non-limiting embodiment of a disclosed rotor structure, as may be used in industrial applications involving turbomachinery, such as without limitation, centrifugal compressors.

FIG. 1 illustrates a fragmentary, cross-sectional view of one non-limiting embodiment of a disclosed rotor compressor 100, as may be used in industrial applications involving turbomachinery, such as without limitation, compressors (e.g., centrifugal compressors, etc.).

In one disclosed embodiment, a tie bolt 102 extends along a rotor axis 103 between a first end and a second end of the tie bolt 102. To avoid visual cluttering, just one end of the tie bolt is illustrated since, for purposes of the present disclosure, the structural and/operational relationships in connection with each end of the tie bolt 102 are the same. A rotor shaft 104 may be fixed to the first end of tie bolt 102. A second rotor shaft may be fixed to the second end of the tie bolt (as noted above, neither the second end of the tie bolt nor the second rotor shaft are shown). The rotor shafts may be referred to in the art as stubs shafts. It will be appreciated that in certain embodiments more than two rotor shafts may be involved.

A plurality of impeller bodies may be disposed between the rotor shafts and supported by tie bolt 102. For simplicity of illustration, a first impeller body $106_1$ and a just a portion of a second impeller body $106_2$ are illustrated in FIG. 1. By way of example, a back side of impeller body $106_1$ is mechanically coupled to an inlet side of impeller body $106_2$ for rotation about the rotor axis 103 by way of a hirth coupling 108. In the illustrated embodiment, an additional hirth coupling 109 may be used to respectively mechanically couple the inlet side of impeller body $106_1$ with adjacent rotor shaft 104. It will be appreciated that the foregoing arrangement of impeller bodies and hirth couplings is just one example and should not be construed in a limiting sense.

A seal element 120 is affixed onto respective outward surfaces of any two adjacent impeller bodies (e.g., adjacent impeller bodies $106_1$, $106_2$). Seal element 120 may be arranged to span (e.g., along 360 degrees) a circumferentially extending spacing 126 between adjacent impeller bodies $106_1$, $106_2$ to inhibit passage onto respective hirth coupling 108 of process fluid being processed by the compressor. Similarly, a seal element 130 is affixed onto respective outward surfaces of an impeller body and an adjacent rotor shaft (e.g., impeller body $106_1$ and adjacent rotor shaft 104) to inhibit passage onto hirth coupling 109 of the process fluid being processed by the compressor.

Figure 2:
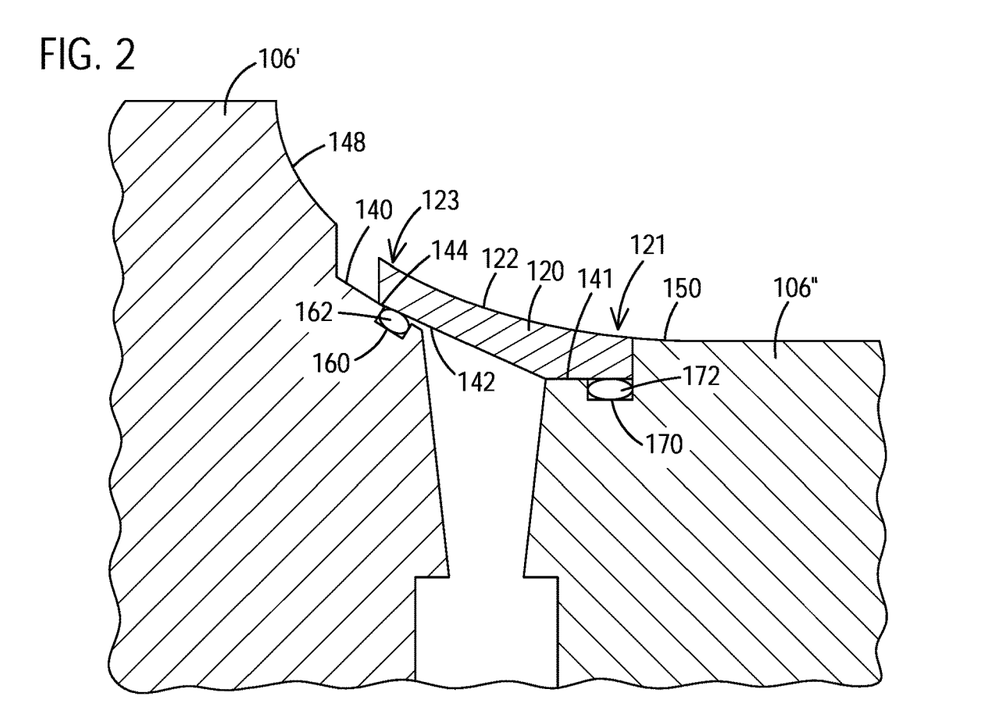
FIG. 2 illustrates a zoomed-in, cross-sectional view of one non-limiting embodiment of a disclosed seal element for a compressor rotor and two adjacent rotor components onto which the seal element is affixed. The seal element being movable between a first position (e.g., a pre-assembly position) and a second position (e.g., assembled position).

As elaborated in greater detail below, seal element 120 may be respectively movable between a first position (the pre-assembly position) and a second position (the assembled position). The foregoing movable features of seal element 120 are equally applicable to seal element 130. FIG. 2 illustrates seal element 120 when in the first position and FIG. 3 illustrates seal element 120 when in the second position.

Figure 3:
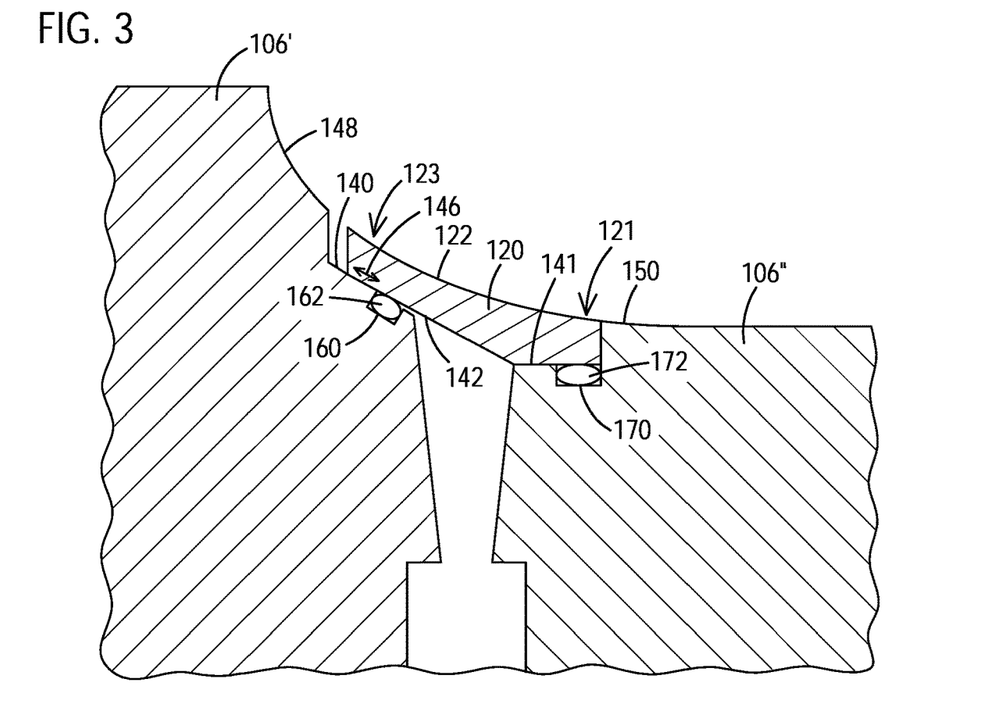
FIG. 3 illustrates the disclosed seal element shown in FIG. 2 when in the assembled position.
Figure 4:
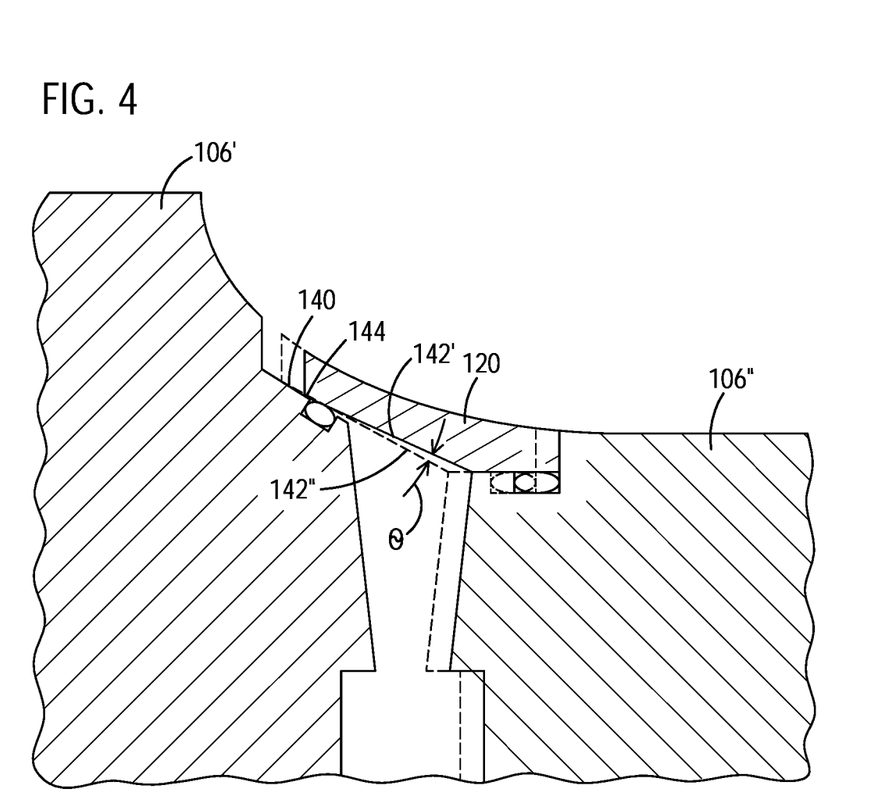
FIG. 4 is a superposition of FIGS. 2 and 3 illustrating a dashed outline of the seal element when in the assembled position (FIG. 3). The dashed outline of the seal element is superimposed on the seal element when in the pre-assembly position shown in FIG. 2.

FIG. 4 is a superposition of FIGS. 2 and 3 illustrating an outline (schematically represented by dashed lines) of the seal element when in the assembled position (FIG. 3), which is superimposed on the seal element when in the pre-assembly position shown in FIG. 2.

As may be better appreciated in FIGS. 2 and 3, seal element 120, for example, may have a first end 121 mechanically coupled to a second rotor component 106" and a second end 123 mechanically coupled to a first impeller body 106'. In general, second rotor component 106" may be any given rotor component, such as a second impeller body, a rotor shaft or a balance piston, adjacent to first impeller body 106' and mechanically connected to first impeller body 106' for rotation about the rotor axis by way of a hirth coupling, as discussed above in the context of FIG. 1. Accordingly, the description below may be similarly applicable regardless of whether the second rotor component 106" is an impeller body, a rotor shaft or a balance piston. For simplicity of illustration, the hirth couplings that connect first impeller body 106' to second rotor component 106" are not illustrated in FIG. 2-7.

Without limitation, first impeller body 106' may define a frustoconical outer surface 140 having a first angle, which is fixed with respect to the rotor axis. The second end 123 of seal element 120 may define a frustoconical inner surface 142 having a second angle that is elastically changeable with respect to the rotor axis, and thus changeable with respect to frustoconical outer surface 140.

As can be appreciated in FIG. 2, in the first position (e.g., the pre-assembly position) the first angle of frustoconical outer surface 140 and the second angle of frustoconical inner surface 142 are such to permit frustoconical surfaces 140, 142 to contact one another at a point 144, such as may define an initial contact point of the second end 123 of seal element 120 with frustoconical outer surface 140, for example. As can be appreciated in FIG. 3, in the second position (e.g., the assembled position) the first angle of frustoconical outer surface 140 and the second angle of frustoconical inner surface 142 are such to permit frustoconical surfaces 140, 142 to make surface-to-surface engagement, as schematically represented by twin-headed arrow 146.

That is, the frustoconical inner surface 142 of seal element 120, such as in response to axial compressive loading applied by second rotor component 106" with respect to first impeller body 106', causes the frustoconical inner surface 142 of seal element 120 to elastically flex, as seal element 120 moves together with second rotor component 106" in a direction opposite the first axial end 121 of seal element 120 toward first impeller body 106' and engages onto the frustoconical outer surface 140 of first impeller body 106'. The flexing of frustoconical inner surface 142 of seal element 120 causes the seal element to be in a spring-loaded condition, which in turn generates a biasing force arranged to circumferentially clamp onto the frustoconical outer surface 140 of first impeller body 106'. It will be appreciated that for servicing operations, for example, seal element 120 may be movable from the second position (the assembled position) to the first position, which in this case would permit user-friendly removal and/or replacement of seal element 120.

As shown in FIGS. 2-3, second rotor component 106" may include a cylindrical outer surface 141, where the first end 121 of seal element 120 may be affixed to the cylindrical outer surface 141 by way of a slip fit or by way of an interference fit, (which may also be referred in the art as a press fit), and which, for example, could involve shrink-fitting techniques for affixing the first end 121 of seal element 120 onto the cylindrical outer surface 141 of second rotor component 106".

In one non-limiting embodiment, a first circumferentially-extending groove 160 may be disposed in the frustoconical outer surface 140 of first impeller body 106' and a first seal member 162 may be positioned in the groove 160 to form a seal between the frustoconical outer surface 140 of first impeller body 106' and the seal element 120.

In one non-limiting embodiment, a second circumferentially-extending groove 170 may be disposed in the cylindrical outer surface 141 of second rotor component 106", and a second seal member 172 may be positioned in the groove 170 to form a seal between the cylindrical outer surface 141 of second rotor component 106" and the seal element 120.

Without limitation, seal member 162 or seal member 172 may be an O-ring seal member, which may comprise an elastomeric material or a non-elastomeric material, such as PTFE (Polytetrafluoroethylene) material, a C-shaped seal member, a leaf seal member, an omega-shaped seal member, a metallic seal member, a metallic cloth seal member or other seal member. As will be appreciated by one skilled in the art, a metallic cloth seal may comprise a high temperature-resistant material, such as metal, ceramic or polymer fibers which may be woven, knitted or otherwise pressed into a layer of fabric.

As may be appreciated in FIG. 4, angle Θ schematically represents an angle that frustoconical inner surface 142" of seal element 120 would flex when in the second position (e.g., the assembled position) to circumferentially clamp onto the frustoconical outer surface 140 of first impeller body 106'. Frustoconical inner surface 142' is indicative of seal element 120 when in the first position, where frustoconical inner surface 142' is at an angle that permits frustoconical surfaces 140, 142' to contact one another at point 144.

In one non-limiting embodiment, as shown in FIGS. 2-3, first impeller body 106' may define a first outer surface 148 having a first contour, second rotor component 106" may define a second outer surface 150 having a second contour and seal element 120 may define an outer surface 122 that provides a continuous contour transition between the first contour and the second contour.

In the embodiment illustrated in FIGS. 2-3, the outer surface 122 of seal element 120 may comprise a curving contour transition between the first contour defined by the first outer surface 148 of first impeller body 106' and the second contour defined by the second outer surface 150 of second rotor component 106". That is, the contour transition defined by the outer surface 122 of seal element 120 may be comprise a singular type of contour geometry, such as a curving contour geometry.

Figure 5:
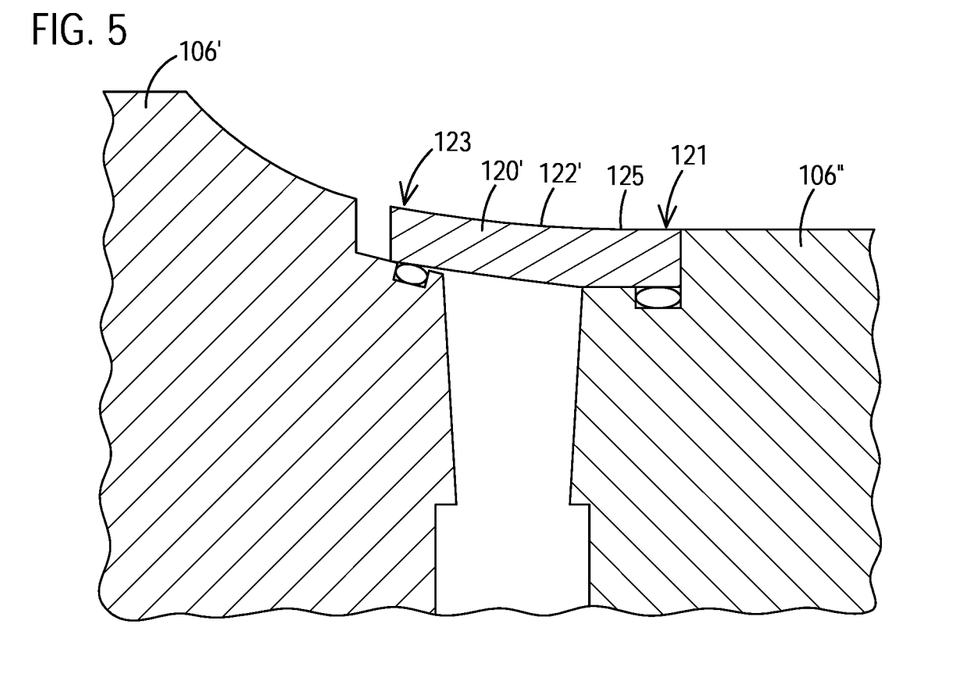
FIG. 5 illustrates a zoomed-in, cross-sectional view of another non-limiting embodiment of a disclosed seal element and two adjacent rotor components onto which the seal element is affixed. The seal element being movable between the pre-assembly position and the assembled position.
Figure 6:
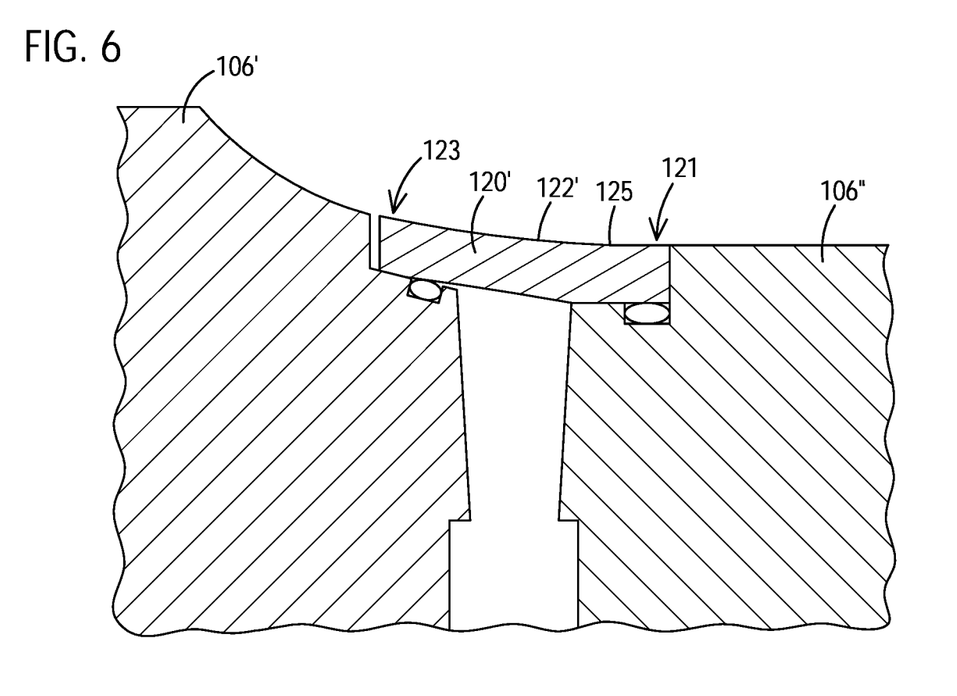
FIG. 6 illustrates the disclosed seal element shown in FIG. 5 when in the assembled position.

By way of comparison, in the embodiment illustrated in FIGS. 5-6, the outer surface 122' of seal element 120' may comprise a cylindrical contour that extends from the first end 121 of seal element 120' to a point 125 (between first end 121 and second end 123 of seal element 120') where the outer surface 122' of seal element 120' changes to a non-cylindrical contour, e.g., a curving contour. That is, the contour transition defined by the outer surface 122' of seal element 120' may comprise two different types of contour geometries, such as a cylindrical contour and a curving contour.

Figure 7:
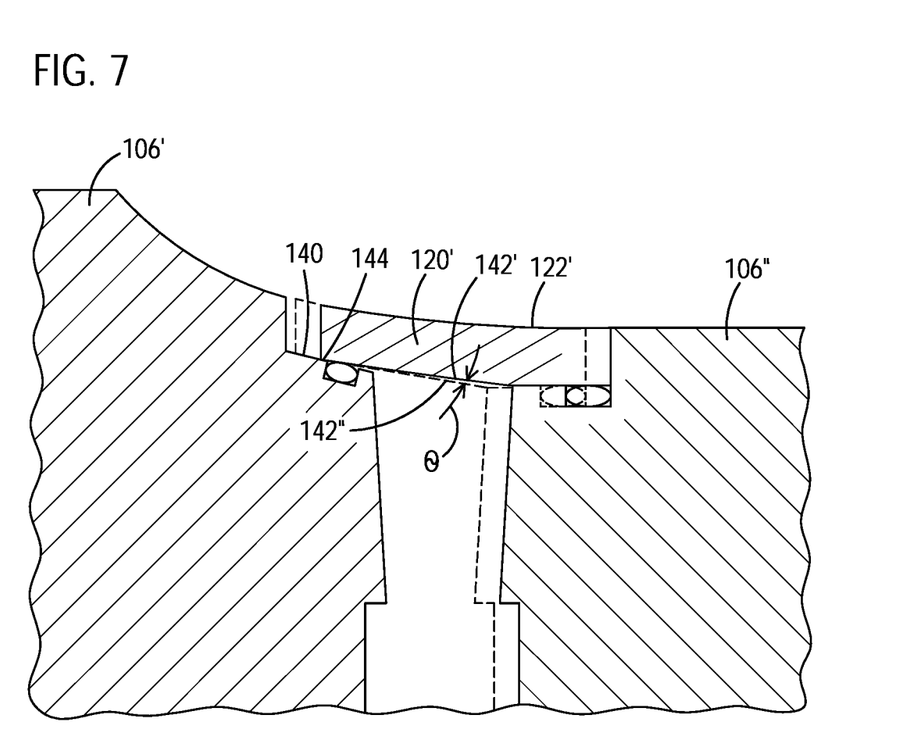
FIG. 7 is a superposition of FIGS. 5 and 6 illustrating a dashed outline of the seal element when in the assembled position (FIG. 6). The dashed outline of the seal element is superimposed on the seal element when in the pre-assembly position shown in FIG. 5.

Further structural and/or operational features described above in the context of FIGS. 2-4 in connection with seal element 120 are equally applicable to seal element 120'. For example, seal element 120' may be respectively movable between a first position (the pre-assembly position) and a second position (the assembled position). FIG. 5 illustrates seal element 120' when in the first position and FIG. 6 illustrates seal element 120' when in the second position. FIG. 7 is a superposition of FIGS. 5 and 6 illustrating an outline (schematically represented by dashed lines) of seal element 120' when in the assembled position (FIG. 6), which is superimposed on seal element 120' when in the pre-assembly position shown in FIG. 5. Accordingly, such structural and/or operational features, having already been described with enough detail in the context of FIGS. 2-4, will not be reiterated here to spare the reader from burdensome and pedantic repetition.

In operation, disclosed embodiments make use of seal elements appropriately arranged to cover the hirth couplings and effective to inhibit passage onto the respective hirth coupling of process fluid being processed by the compressor, and thus inhibiting potential exposure of the hirth couplings and associated structures to contaminants, chemical byproducts, and/or physical debris.

In operation, disclosed embodiments permit user-friendly assembly of the seal elements onto respective outward surfaces of any two adjacent rotor components, such as adjacent impeller bodies or a rotor shaft and an adjacent impeller body. Additionally, disclosed embodiments permit user-friendly disassembly of the seal elements from the respective outward surfaces of any two such adjacent rotor components that, for example, facilitate servicing operations.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A compressor rotor comprising:
   a tie bolt that extends along a rotor axis;
   a first rotor shaft coupled to the tie bolt;
   a second rotor shaft coupled to the tie bolt;
   a first impeller body disposed between the first rotor shaft and the second rotor shaft, the first impeller body including a frustoconical outer surface having a first angle with respect to the rotor axis;
   a second impeller body disposed between the first rotor shaft and the second rotor shaft;
   a hirth coupling positioned to couple the first impeller body and the second impeller body for rotation about the rotor axis; and
   a seal element having a first end coupled to the second impeller body and a second end that defines a frustoconical inner surface having a second angle that is changeable with respect to the rotor axis, the seal element movable between a first position in which the first angle of the frustoconical outer surface and the second angle of the frustoconical inner surface permit said frustoconical surfaces to contact one another at a point, and a second position in which the first angle of the frustoconical outer surface and the second angle of the frustoconical inner surface permit said surfaces to make surface-to-surface engagement.

2. The compressor rotor of claim 1, wherein the first impeller body defines a first outer surface having a first contour, the second impeller body defines a second outer surface having a second contour, and the seal element defines an outer surface that provides a continuous transition between the first contour and the second contour.

3. The compressor rotor of claim 2, wherein the outer surface of the seal element comprises a cylindrical contour extending from the second end of the seal element to a point where the outer surface of the seal element transitions to a non-cylindrical contour.

4. The rotor structure of claim 1, wherein the second impeller body includes a cylindrical outer surface, wherein the first end of the seal element is affixed to the cylindrical outer surface by way of a slip fit or an interference fit.

5. The compressor rotor of claim 4, further comprising a first circumferentially-extending groove in the frustoconical outer surface of the first impeller body, and a first seal member positioned in the groove to form a seal between the frustoconical outer surface of the first impeller body and the seal element.

6. The compressor rotor of claim 5, wherein the first seal member in the first circumferentially-extending groove is an O-ring.

7. The compressor rotor of claim 5, further comprising a second circumferentially-extending groove in the cylindrical surface of the second impeller body, and a second seal member positioned in the groove to form a seal between the cylindrical outer surface of the second impeller body and the seal element.

8. The compressor rotor of claim 7, wherein the second seal member in the second circumferentially-extending groove is an O-ring.

9. The compressor rotor of claim 1, comprising a further hirth coupling positioned to couple a respective one of the first and second rotor shafts to an adjacent impeller body, the adjacent impeller body including a frustoconical outer surface having a first angle with respect to the rotor axis, and a further seal element having a first end coupled to the respective rotor shaft and a second end that defines a frustoconical inner surface having a second angle that is changeable with respect to the rotor axis, the further seal element movable between a first position, in which the first angle of the frustoconical outer surface of the adjacent impeller body and the second angle of the frustoconical inner surface of the respective rotor shaft permit said frustoconical surfaces to contact one another at a point, and a second position in which the first angle of the frustoconical outer surface and the second angle of the frustoconical inner surface permit said surfaces to make surface-to-surface engagement.

10. The compressor rotor of claim 9, wherein the adjacent impeller body defines a first outer surface having a first contour, the respective rotor shaft defines a second outer surface having a second contour, and the further seal element defines a further outer surface that provides a continuous transition between the first contour of the adjacent impeller body and the second contour of the respective rotor shaft.

11. The compressor rotor of claim 10, wherein the respective rotor shaft includes a cylindrical outer surface, wherein the first end of the further seal element is affixed to the cylindrical outer surface by way of a slip fit or an interference fit.

12. The compressor rotor of claim 11, further comprising a first circumferentially-extending groove in the frustoconical outer surface of the adjacent impeller body, and a first seal member positioned in the groove to form a seal between the frustoconical outer surface of the adjacent body and the further seal element.

13. The compressor rotor of claim 12, wherein the first seal member in the first circumferentially-extending groove is an O-ring.

14. The compressor rotor of claim 12, further comprising a second circumferentially-extending groove in the cylindrical surface of the respective rotor shaft, and a second seal member positioned in the groove to form a seal between the cylindrical outer surface of the respective rotor shaft and the further seal element.

15. The compressor rotor of claim 14, wherein the second seal member in the second circumferentially-extending groove is an O-ring.

16. The compressor rotor of claim 7, wherein the first seal member and/or the second seal member is selected from the group consisting of an O-ring seal member, a C-shaped seal member, a leaf seal member, an omega-shaped seal member, a metallic seal member, and a metallic cloth seal member.

17. A centrifugal compressor comprising the compressor rotor of claim 1.

18. The compressor rotor of claim 14, wherein the first seal member and/or the second seal member is selected from the group consisting of an O-ring seal member, a C-shaped seal member, a leaf seal member, an omega-shaped seal member, a metallic seal member, and a metallic cloth seal member.

* * * * *